United States Patent
Hu et al.

(10) Patent No.: US 7,071,262 B2
(45) Date of Patent: Jul. 4, 2006

(54) COMPATIBILIZING AGENT BASED ON POLYOLEFIN WITH POLYAMIDE GRAFTS AND MIXTURES COMPRISING SAME

(75) Inventors: Guo-Hua Hu, Nancy (FR); Huxi Li, Sartrouville (FR); Heike Faulhammer, Serquigny (FR); Nicola Hoogen, München (DE); Thierry Vivier, Gemenos (FR)

(73) Assignee: Atofina, Puteaux (FR)

( * ) Notice: Subject to any disclaimer, the term of this patent is extended or adjusted under 35 U.S.C. 154(b) by 102 days.

(21) Appl. No.: 10/343,238

(22) PCT Filed: Jul. 27, 2001

(86) PCT No.: PCT/FR01/02471

§ 371 (c)(1),
(2), (4) Date: Sep. 9, 2003

(87) PCT Pub. No.: WO02/10236

PCT Pub. Date: Feb. 7, 2002

(65) Prior Publication Data

US 2004/0030045 A1 Feb. 12, 2004

(30) Foreign Application Priority Data

Aug. 1, 2000 (FR) .................................. 00 10109

(51) Int. Cl.
*C08L 77/00* (2006.01)

(52) U.S. Cl. .......................... 525/66; 525/183; 525/184

(58) Field of Classification Search .................. 525/66, 525/184, 183
See application file for complete search history.

(56) References Cited

U.S. PATENT DOCUMENTS

| 3,136,738 A | 6/1964 | Hedrick et al. |
| 3,465,059 A | 9/1969 | Seven et al. |
| 5,342,886 A | 8/1994 | Glotin et al. |
| 5,939,512 A * | 8/1999 | Gervasi et al. ............. 528/170 |

FOREIGN PATENT DOCUMENTS

| EP | 0 342 066 | 11/1989 |
| EP | 0 558 990 | 9/1993 |
| FR | 2 107 538 | 4/1972 |
| GB | 1 205 424 | 9/1970 |
| GB | 1 345 747 | 2/1974 |
| WO | WO 99 50323 | 10/1999 |

* cited by examiner

*Primary Examiner*—Ana Woodward
(74) *Attorney, Agent, or Firm*—Smith, Gambrell & Russell, LLP.

(57) ABSTRACT

According to a first form, the present invention relates to a compatibilizer composed of a polyolefin backbone and of polyamide grafts in which:
the grafts are attached to the backbone via the residues of an unsaturated monomer (A) having a functional group which acts as activator in the polymerization of lactams and which is not an isocyanate functional group,
the residues of the unsaturated monomer (A) are fixed to the backbone by grafting from its double bond.

The invention also relates to a process for the preparation of these compatibilizers in which, after the preparation of the backbone comprising the monomer having an activating functional group, the precursor lactam of the grafts and a catalyst are added and heating is carried out in order to obtain anionic polymerization of the lactam which spreads starting from the activating functional group. Subsequently, the compatibilizer and the polyamide which has formed apart from the grafts are optionally separated.

10 Claims, No Drawings

COMPATIBILIZING AGENT BASED ON POLYOLEFIN WITH POLYAMIDE GRAFTS AND MIXTURES COMPRISING SAME

FIELD OF THE INVENTION

The present invention relates to a compatibilizer based on a polyolefin with polyamide grafts and to the blends comprising this compatibilizer. The polymer blends make it possible to prepare materials having improved or different properties in comparison with the polymers of which they are composed. However, the polymers are not always miscible with one another and it is necessary to add thereto a compatibilizing agent which is generally another polymer having affinity with each of the polymers to be blended. The compatibilizers of the invention are of use in compatibilizing polyamides and polyolefins. The invention also relates to the blends of polyamide and of polyolefin comprising this compatibilizer.

BACKGROUND OF THE INVENTION

U.S. Pat. No. 5,342,886 discloses polymer blends comprising a compatibilizer and more particularly blends of polyamide and of polypropylene. The compatibilizer is composed of a polypropylene backbone to which are attached polyamide grafts. This compatibilizer is prepared from a polypropylene homopolymer or copolymer (the backbone) to which maleic anhydride is grafted. Separately, polyamide with a monoamine ending, that is to say having an amine end and an alkyl end, is prepared. Then, by melt blending, the monoamino polyamide will become fixed to the polypropylene backbone by reaction between the amine functional group and the maleic anhydride.

Patent WO 9950323 discloses an improvement of the preceding prior art. According to this prior art, 3-isopropenyl-α,α-dimethylbenzyl isocyanate (TMI) of following formula:

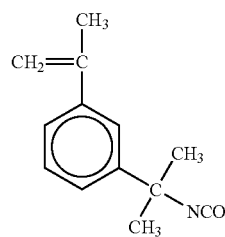

is grafted to the polypropylene backbone, the fixing of the TMI to the backbone being carried out via the double bond. The amount of grafted TMI is at most 1.8 parts by weight per 100 parts of the backbone. Caprolactam and sodium caprolactomate as catalyst are then added. Anionic polymerization of the caprolactam is thus carried out, which polymerization begins and grows starting with the isocyanate functional group which has been grafted onto the polypropylene backbone. The isocyanate functional group acts as activator for this polymerization. However, as the polymerization of the caprolactam to form the grafts is very slow, it is necessary to add activator in addition to the isocyanate but, in addition to the compatibilizer, PA 6 homopolymer is manufactured.

It has now been found that it is no longer necessary to add activator in addition to the isocyanate grafted onto the polypropylene backbone provided that the amount of grafted TMI is at least 2 parts by weight per 100 parts of backbone. The caprolactam polymerizes essentially starting from the isocyanate activator and the compatibilizer comprising essentially no PA 6 homopolymer is obtained.

It has also been found that it is possible to manufacture compatibilizers composed of a polyolefin backbone to which are fixed polyamide grafts using other polyolefin backbones and/or other monomers for the fixing and the growth of the polyamide grafts.

SUMMARY OF THE INVENTION

According to a first form, the present invention relates to a compatibilizer composed of a polyolefin backbone and of polyamide grafts in which:
the grafts are attached to the backbone via the residues of an unsaturated monomer (A) having a functional group which acts as activator in the polymerization of lactams and which is not an isocyanate functional group,
the residues of the unsaturated monomer (A) are fixed to the backbone by grafting from its double bond.

The invention also relates to a process for the preparation of the compatibilizer of this first form in which (i) the unsaturated monomer (A) is grafted to the polyolefin backbone and then (ii) the precursor lactam of the grafts and a catalyst are added and heating is carried out in order to obtain anionic polymerization of the lactam, which spreads starting from the activating functional group carried by (A). Subsequently, the compatibilizer and the polyamide which has formed apart from the grafts are optionally separated.

According to an alternative form of this first form, the monomer (A) is not fixed to the backbone by grafting from its double bond but is introduced by copolymerization during the preparation of the backbone.

Thus, according to an alternative form of the first form, the present invention relates to a compatibilizer composed of a polyolefin backbone and of polyamide grafts in which:
the grafts are attached to the backbone via the residues of an unsaturated monomer (A) having a functional group which acts as activator in the polymerization of lactams and which is not an isocyanate functional group,
the residues of the unsaturated monomer (A) are fixed to the backbone by copolymerization from its double bond.

The invention also relates to a process for the preparation of the compatibilizer of this alternative form of the first form in which (i) the unsaturated monomer (A) and the other constituents of the polyolefin backbone are copolymerized and then (ii) the precursor lactam of the grafts and a catalyst are added and heating is carried out in order to obtain anionic polymerization of the lactam which spreads starting from the activating functional group carried by (A). Subsequently, the compatibilizer and the polyamide which has formed apart from the grafts are optionally separated.

This first alternative form is particularly advantageous for compatibilizers in which (A) is an unsaturated carboxylic acid anhydride, such as, for example, maleic anhydride, since polyolefins comprising copolymerized maleic anhydride are easy to prepare, are inexpensive and are industrially available.

According to a second form, the present invention relates to a compatibilizer composed of a backbone formed from copolymer of ethylene and of at least one unsaturated carboxylic acid ester and of polyamide grafts in which:

the grafts are attached to the backbone via the residues of an unsaturated monomer (A2) having an isocyanate functional group which acts as activator in the polymerization of lactams, the residues of the unsaturated monomer (A2) are fixed to the backbone by grafting from its double bond.

The invention also relates to a process for the preparation of the compatibilizer of this second form in which (i) the unsaturated monomer (A2) is grafted to the backbone formed from copolymer of ethylene and of at least one unsaturated carboxylic acid ester and then (ii) the precursor lactam of the grafts and a catalyst are added and heating is carried out in order to obtain anionic polymerization of the lactam, which spreads starting from the activating functional group carried by (A2). Subsequently, the compatibilizer and the polyamide which has formed apart from the grafts are optionally separated.

According to an alternative form of this second form, the monomer (A2) is not fixed to the backbone by grafting but was introduced by copolymerization during the preparation of the backbone.

Thus, according to an alternative form of the second form, the present invention relates to a compatibilizer composed of a backbone formed from copolymer of ethylene and of at least one unsaturated carboxylic acid ester and of polyamide grafts in which:

the grafts are attached to the backbone via the residues of an unsaturated monomer (A2) having an isocyanate functional group which acts as activator in the polymerization of lactams, the residues of the unsaturated monomer (A2) are fixed to the backbone via copolymerization from its double bond.

The invention also relates to a process for the preparation of the compatibilizer of this alternative form of the second form in which (i) the unsaturated monomer (A2) and the other constituents of the backbone formed from copolymer of ethylene and of at least one unsaturated carboxylic acid ester are copolymerised and then (ii) the precursor lactam of the grafts and a catalyst are added and heating is carried out in order to obtain anionic polymerization of the lactam which spreads starting from the activating functional group carried by (A2). Subsequently, the compatibilizer and the polyamide which has formed apart from the grafts are optionally separated.

According to a third form, the present invention relates to a compatibilizer composed of a polyolefin backbone and of polyamide grafts in which:

the grafts are attached to the backbone via the residues of a difunctional monomer (A3) having a first functional group which acts as activator in the polymerization of lactams and a second functional group capable of reacting with a reactive site of the polyolefin backbone, the residues of the unsaturated monomer (A3) are fixed to the backbone by reaction of its second functional group with a reactive site of the polyolefin backbone.

The invention also relates to a process for the preparation of the compatibilizer of this third form in which (i) the difunctional monomer (A3) is attached to the polyolefin backbone and then (ii) the precursor lactam of the grafts and a catalyst are added and heating is carried out in order to obtain anionic polymerization of the lactam, which spreads starting from the activating functional group carried by (A3). Subsequently, the compatibilizer and polyamide which has formed apart from the grafts are optionally separated.

According to a fourth form, the present invention relates to a compatibilizer composed of a polyolefin backbone and of polyamide grafts in which:

the grafts are attached to the backbone via the residues of an unsaturated monomer (A2) having an isocyanate functional group which acts as activator in the polymerization of lactams, the residues of the unsaturated monomer (A2) are fixed to the backbone by grafting from its double bond and the proportion of grafted (A2) is at least 2 parts by weight per 100 parts of backbone.

The invention also relates to a process for the preparation of the compatibilizer of this fourth form in which (i) the unsaturated monomer (A2) is grafted to the polyolefin backbone, the proportion of grafted (A2) being at least two parts by weight per 100 parts of backbone, and then (ii) the precursor lactam of the grafts and a catalyst are added and heating is carried out in order to obtain anionic polymerization of the lactam, which spreads starting from the activating functional group carried by (A2).

According to an alternative form of this fourth form, the monomer (A2) is not fixed to the backbone by grafting from its double bond but was introduced by copolymerization during the preparation of the backbone. Thus, according to an alternative form of the fourth form, the present invention relates to a compatibilizer composed of a polyolefin backbone and of polyamide grafts in which:

the grafts are attached to the backbone via the residues of an unsaturated monomer (A2) having an isocyanate functional group which acts as activator in the polymerization of lactams, the residues of the unsaturated monomer (A2) are fixed to the backbone by copolymerization from its double bond and the proportion of (A2) is at least 2 parts by weight per 100 parts of backbone.

The invention also relates to a process for the preparation of the compatibilizer of this alternative form of the fourth form in which (i) the unsaturated monomer (A2) and the other constituents of the polyolefin backbone are copolymerized, the proportion of (A2) being at least 2 parts by weight per 100 parts of backbone, and then (ii) the precursor lactam of the grafts and a catalyst are added and heating is carried out in order to obtain anionic polymerization of the lactam, which spreads starting from the activating functional group carried by (A2).

The present invention also relates to blends of polyamide, of polyolefin and of the compatibilizer which is described above. Depending upon the nature of the polyamide in these blends, the compatibilizer can optionally be used without having separated it from the polyamide which has formed apart from the grafts.

DETAILED DESCRIPTION OF THE INVENTION

As regards the first form and the polyolefin backbone, this polyolefin is conventionally a homopolymer or copolymer of alpha-olefins or of diolefins, such as, for example, ethylene, propylene, 1-butene, 1-octene or butadiene. Mention may be made, by way of examples, of:

polyethylene homopolymers and copolymers, in particular LDPE, HDPE, LLDPE (linear low density polyethylene), VLDPE (very low density polyethylene) and metallocene polyethylene, propylene homopolymers or copolymers, ethylene/alpha-olefin copolymers, such as ethylene/propylene, EPR (abbreviation for ethylene-propylene rubber) and ethylene/propylene/diene (EPDM) copolymers.

copolymers of ethylene with at least one product chosen from salts or esters of unsaturated carboxylic acids, such as alkyl (meth)acrylate (for example methyl acrylate), it being possible for the proportion of comonomer to reach 40% by weight, styrene/ethylene-butene/styrene (SEBS), styrene/butadiene/styrene (SBS), styrene/isoprene/styrene (SIS) or styrene/ethylene-propylene/styrene (SEPS) block copolymers.

Use is advantageously made of a polypropylene homopolymer or copolymer which can comprise up to 30 molar % of ethylene. The MFI (abbreviation for Melt Flow Index) is advantageously between 0.2 and 500 g/10 min (ASTM D 1238 at 230° C. under 2.16 kg) and preferably from 0.2 to 200.

Advantageously, use is also made of a polyethylene homopolymer or copolymer, such as, for example, an ethylene/alkyl (meth)acrylate copolymer.

As regards (A), mention may be made, as examples of a functional group which acts as activator, of the oxazoline, nitrile, acid chloride, amide, imide, ester and carboxylic acid anhydride functional groups. Mention may be made, as examples of (A), of derivatives of unsaturated carboxylic acids, such as anhydrides, esters, amides or imides. Examples of unsaturated carboxylic acids are those having 2 to 20 carbon atoms, such as acrylic, methacrylic, maleic, fumaric and itaconic acids.

Anhydrides of unsaturated dicarboxylic acids having 4 to 10 carbon atoms are particularly preferred grafting monomers. These grafting monomers comprise, for example, maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2,3-dicarboxylic and x-methylbicyclo[2.2.1]hept-5-ene-2,2-dicarboxylic anhydrides. Maleic anhydride is advantageously used.

Mention may also be made, as examples of (A), of the oxazolines of following formula:

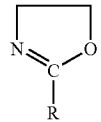

in which R derives from an alkyl, aromatic or cycloalkyl group and carries a double bond capable of opening in order to copolymerize or to graft to the backbone. Mention may be made, as example, of isopropenyloxazoline.

Various known processes can be used for grafting the monomer (A) to the polyolefin backbone.

It would not be departing from the scope of the invention to graft a mixture of two or more different monomers (A).

For example, this can be carried out by heating the polyolefin backbone at a high temperature, approximately 150° to approximately 300° C., in the presence of a radical initiator.

Appropriate radical initiators which can be used comprise t-(butyl hydroperoxide, cumene hydroperoxide, diisopropylbenzene hydroperoxide, di-t-butyl peroxide, t-butyl cumyl peroxide, dicumyl peroxide, 1,3-bis(t-butylperoxyisopropyl)benzene, acetyl peroxide, benzoyl peroxide, isobutyryl peroxide, bis(3,5,5-trimethylhexanoyl) peroxide and methyl ethyl ketone peroxide.

The amount of radical initiator can be from 0.05 to 5% by weight of the polyolefin backbone and advantageously between 0.05 and 2%.

The amount of grafting monomer (A) can be appropriately chosen but it is preferably from 0.01 to 10 parts by weight, better still from 0.1 to 5 parts, per 100 parts of backbone to be grafted.

As regards the unsaturated carboxylic acid anhydrides, the amount of grafted monomer (A) is determined by quantitative determination of the succinic functional groups by FTIR spectroscopy.

The grafting can be carried out in a known way using any device for mixing thermoplastics, such as a blender, a mixer or an extruder.

Under the action of the radicals, side reactions take place at the same time as the grafting reaction. They result in an increase in the molecular mass in the case where the polymer backbone to be grafted is essentially polyethylene or in its decrease in the case where it is essentially polypropylene. If the amount of radicals necessary for the grafting reaction is high, the change in the molecular mass of the polyolefin results in a significant modification in its melt viscosity.

These graftings are generally carried out in an extruder. The viscosity of the grafted polyethylene is so high that it can no longer be extruded; the viscosity of the grafted polypropylene is so low that it also can no longer be extruded. These phenomena reduce the amount of monomer (A) which can be incorporated onto the polyolefin by radical grafting.

Mention may be made, as examples of a product which significantly reduces the decomposition of the polypropylene backbone, of the styrene compounds of following formula:

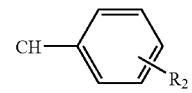

in which $R_2$ denotes H, OH, $CH_3$ or an alkyl. Preferably, $R_2$ is H, that is to say that the product is styrene. The amount of product to be used can be between 0.01 and 10% by weight of the polyolefin backbone and advantageously between 0.5 and 5%.

Mention may be made, as examples of a product which decreases the side reactions on the polyolefin backbones brought about by the radical initiators necessary for the grafting of (A), of stable nitroxide radicals. These stable free radicals should not be confused with the preceding radicals (resulting from peroxides or azos), the lifetime of which is fleeting (a few milliseconds).

Mention may be made, as illustration of such nitroxides, of:

2,2,5,5-tetramethyl-1-pyrrolidinyloxy (Proxyl),
2,2,6,6-tetramethyl-1-piperidinyloxy, generally sold under the name Tempo,
N-tert-butyl-1-phenyl-2 methylpropyl nitroxide,
N-tert-butyl-1-(2-naphthyl)-2-methylpropyl nitroxide,
N-tert-butyl-1-diethylphosphono-2,2-dimethylpropyl nitroxide,
N-tert-butyl-1-dibenzylphosphono-2,2-dimethylpropyl nitroxide, N-phenyl-1-diethylphosphono-2,2-dimethylpropyl nitroxide,
N-phenyl-1-diethylphosphono-1-methylethyl nitroxide,
N-(1-phenyl-2-methylpropyl)-1-diethylphosphono-1-methylethyl nitroxide.

Preferably, Tempo will be used.

The amount of stable free radical can be between 0.05 and 200 millimole per kg of polymer backbone to be grafted, advantageously from 0.1 to 10 and preferably from 0.3 to 5.

Mention may be made, as examples of lactams, of those having from 3 to 12 carbon atoms on the main ring, it being possible for these atoms to be substituted. Mention may be made, for example, of β,β-dimethylpropiolactam, α,α-dimethylpropiolactam, amylolactam, caprolactam, capryllactam and lauryllactam. It would not be departing from the scope of the invention to use two or more lactams.

The catalyst is a base which is sufficiently strong to create a lactamate. Mention may be made, as examples of the catalyst, of sodium, potassium, alkali metal hydrides, alkali metal hydroxides or alkali metal alkoxides, such as sodium methoxide or ethoxide. It is also possible to use an already prepared lactamate, such as a sodium lactamate, and to add it to the blend of the polyolefin backbone grafted by (A) and of the lactam. The proportion of catalyst and of lactam can be between 0.1 and 10 mol of catalyst per 100 mol of lactam and preferably between 0.3 and 5. It is also possible to add a chain-limiting agent, such as, for example, ethylenebisstearamide, ethylenebisoleamide or acetanilide.

The reaction can be carried out in the same device used for the grafting of (A). For example, if an extruder was used, the grafting was carried out in the first zones and the lactam and the catalyst are introduced into the following zones. The anionic polymerization of lactam and the formation of the grafts from the activating functional groups of (A) take place at a temperature above the melting temperature of the polyamide constituting the grafts. This temperature is advantageously from 20 to 110° C. above this melting temperature.

If the grafted amount of (A) is too low and thus there is not enough activator for the anionic polymerization to be able to take place with a reasonable rate, that is to say of the order of 2 to 10 minutes, then either an additional activator is added or the temperature is increased. This activator can be the same functional group as the functional group carried by (A) or another activator. Preferably, this activator is added after having added the lactam and the catalyst.

As regards the activator, any product capable of provoking and/or accelerating the polymerization is thus denoted. Mention may be made, as examples, of lactam-N-carboxyanilides, isocyanates, carbodiimides, cyanimides, acyllactams, triazines, ureas, n-substituted imides or esters. The activator can be formed in situ, for example an acyllactam is obtained by adding an alkyl isocyanate to the lactam.

The ratio of the catalyst to the activator, in moles, can be between 0.2 and 10. It is, of course, the total amount of activator, that is to say that originating from (A) and that additionally added with the lactam.

If activator is added in addition to that contributed by (A), a blend of compatibilizer and of polyamide, in addition to that of the grafts, resulting from the anionic polymerization of the lactam with itself is obtained. If activator in addition to that contributed by (A) is not added, only the compatibilizer and no polyamide apart from the grafts is obtained, or low amounts, that is to say less than 2 or 3% by weight of the compatibilizer.

The number of grafts increases with the amount of (A) grafted to the backbone. The length of the grafts increases with the amount of lactam. The proportion of polyamide produced apart from that of the grafts increases with the amount of lactam and the amount of activator added in addition to that contributed by (A). The reaction rate increases with the temperature.

The product obtained on conclusion of the anionic polymerization of the lactam, which can be compatibilizer or a blend of compatibilizer and of polyamide, can either be used directly, that is to say blended with a polyamide and/or a polyolefin, or recovered in the form of granules and used subsequently.

The compatibilizer and the polyamide which has formed apart from the grafts can be separated by any means. Polyolefin backbone which has not been grafted may also remain. The polyolefin is soluble in hot xylene and the polyamide in formic acid. Thus, these two products can be completely dissolved, whereas the compatibilizer constitutes the insoluble residue.

Even if the amount of activator contributed by (A) is sufficient, the additional activator can be added with the lactam in order to directly prepare a blend of compatibilizer and of polyamide. A polyolefin can also be added, at the same time as the lactam or after the end of the anionic polymerization of the lactam, in order thus to directly prepare a blend of polyamide, polyolefin and a compatibilizing agent.

As regards the alternative form of the first form of the invention, it is that in which (A) is introduced into the backbone by copolymerization and not by grafting. The copolymer comprising (A) is thus a copolymer comprising at least one alpha-olefin and (A) and optionally another comonomer, such as an alkyl (meth)acrylate. Ethylene maleic anhydride and ethylene-alkyl (meth)acrylate-maleic anhydride copolymers are advantageously used. These copolymers comprise from 0.01 to 10% by weight of maleic anhydride and from 0 to 40% and preferably 5 to 40% by weight of alkyl (meth)acrylate. Their MFI is between 20 and 100 (190° C.-2.16 kg). As regards the alkyl (meth)acrylates, the alkyls can have up to 24 carbon atoms. Examples of alkyl acrylate or methacrylate are in particular methyl methacrylate, ethyl acrylate, n-butyl acrylate, isobutyl acrylate or 2-ethylhexyl acrylate.

Use is also made of copolymers of an alpha-olefin and of an oxazoline as mentioned above.

The procedure will be carried out subsequently as in the first form which was described above. That which has been described in the first form remains valid in this alternative form.

As regards the second form of the invention and the copolymer backbone, this is advantageously a copolymer of ethylene and of an alkyl (meth)acrylate. The alkyls can have up to 24 carbon atoms. Examples of alkyl acrylate or methacrylate are in particular methyl methacrylate, ethyl acrylate, n-butyl acrylate, isobutyl acrylate or 2-ethylhexyl acrylate. The MFI (Melt Flow Index) of these copolymers is advantageously between 0.3 and 500 g/10 min (190° C.-2.16 kg). Advantageously, the content of (meth)acrylate is between 2 and 40% by weight of the copolymer and preferably between 9 and 35%. These copolymers can be manufactured by radical polymerization in a tube or autoclave at pressures of between 1000 and 2500 bar.

It would not be departing from the scope of the invention if the copolymer backbone were a blend of two or more of the preceding copolymers.

As regards (A2), this is any unsaturated monomer which carries an isocyanate functional group and which is capable of grafting to the backbone formed from copolymer of ethylene and of at least one unsaturated carboxylic acid ester. It is recommended that it be stable under the conditions of the grafting. Mention may be made, as examples of monomers (A2), of styrene and α-methylstyrene, the benzene nuclei of which carry an isocyanate functional group or the benzene nuclei of which carry an alkyl, this alkyl being substituted by an isocyanate. (A2) is advantageously the TMI described above.

The procedure is subsequently carried out as in the first form which was described above. That which has been described in the first form remains valid mutatis mutandis in this second form. If (A2) is TMI, then the proportion of (A2) grafted onto the backbone, above which it is no longer necessary to add an activator in addition to that contributed by (A2), is 2 parts by weight per 100 parts of polymer backbone.

As regards the third form of the invention, the polyolefin backbone comprises reactive sites. Mention may be made, as examples of sites, of the OH functional groups. The backbone is, for example, a copolymer of ethylene and of vinyl alcohol (EVOH). These copolymers usually comprise from 20 to 60 mol % of ethylene.

Mention may be made, as example, of the ethylene-vinyl alcohol copolymer comprising 38 molar % of ethylene, MFI 8 (210° C., 2.16 kg), melting temperature 183° C., crystallization temperature 160° C., Tg (glass transition temperature) 61° C. Mention may also be made of the ethylene-vinyl alcohol copolymer comprising 29 molar % of ethylene, MFI 15 (230° C., 2.16 kg), melting temperature 188° C., crystallization temperature 163° C., Tg (glass transition temperature) 62° C. Mention may also be made of the ethylene-vinyl alcohol copolymer comprising 32 molar % of ethylene, MFI 6 (230° C., 2.16 kg), melting temperature 188° C., crystallization temperature 163° C., Tg (glass transition temperature) 62° C.

Mention may also be made of polyolefin homopolymers or copolymers carrying carboxylic acid or carboxylic acid anhydride functional groups, such as, for example, ethylene/(meth)acrylic acid or unsaturated carboxylic acid anhydride copolymers, the acid or the anhydride being grafted or copolymerized, these copolymers optionally comprising an alkyl (meth)acrylate.

As regards (A3), mention may be made, by way of examples, of diisocyanates, in order to become fixed to the backbone by reaction with the OH functional groups.

Mention may also be made of the bisoxazolines and oxazolines of following formula:

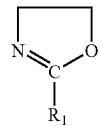

in which $R_1$ derives from an alkyl, aromatic or cycloalkyl group and carries a functional group capable of reacting with another functional group of the backbone. As examples, this functional group carried by $R_1$ can be an acid, hydroxyl or halide functional group.

The procedure is subsequently carried out as in the first form which was described above. That which has been described in the first form remains valid mutatis mutandis in this third form.

As regards the fourth form and the polyolefin backbone, this polyolefin is conventionally a homopolymer or copolymer of alpha-olefins or diolefins, such as, for example, ethylene, propylene, 1-butene, 1-octene or butadiene. Mention may be made, as examples, of:

polyethylene homopolymers and copolymers, in particular LDPE, HDPE, LLDPE (linear low density polyethylene), VLDPE (very low density polyethylene) and metallocene polyethylene, propylene homopolymers or copolymers, ethylene/alpha-olefin copolymers, such as ethylene/propylene, EPR (abbreviation for ethylene-propylene rubber) and ethylene/propylene/diene (EPDM) copolymers.

styrene/ethylene-butene/styrene (SEBS), styrene/butadiene/styrene (SBS), styrene/isoprene/styrene (SIS) or styrene/ethylene-propylene/styrene (SEPS) block copolymers.

Use is advantageously made of a polypropylene homopolymer or copolymer which can comprise up to 30 molar % of ethylene. The MFI (abbreviation for Melt Flow Index) is advantageously between 0.2 and 500 g/10 min (ASTM D 1238 at 230° C. under 2.16 kg) and preferably from 0.2 to 200.

Advantageously, use is also made of a polyethylene homopolymer or copolymer, such as, for example, an ethylene/alkyl (meth)acrylate copolymer.

The monomer (A2) was defined above; the grafted proportion is at least 2 parts by weight per 100 parts of backbone and advantageously between 2 and 4 parts. It is no longer necessary to add an activator in addition to that contributed by (A2).

The procedure is subsequently carried out as in the first form which was described above. That which has been described in the first form remains valid mutatis mutandis in this fourth form.

EXAMPLES

Example

Polymerization of ε-caprolactam in the presence of the macroactivator PP-g-TMI, this designation (macroactivator PP-g-TMI) is used for a polypropylene backbone grafted with TMI (isocyanate) which is manufactured according to prior art WO 9950323.

The polymerization of ε-caprolactam is carried out in the presence of the macroactivator PP-g-TMI (manufactured according to the prior art) with various degrees of TMI grafting: 1.30, 3.34 and 6.47 parts by weight per 100 parts of backbone. The level of macroactivator with respect to the ε-caprolactam is 25 and 50% by weight. The catalyst used consists of Na caprolactamate comprising 1.4 mol of sodium per kg of ε-caprolactam; use is made of a commercial catalyst in the form of chips or flakes sold by BASF under the ref. BASF® C10. The amount of catalyst used is 4 parts by weight per 100 parts of the macroactivator+ε-caprolactam blend.

A Haake Rheocord mixer is preheated to 200° C. (or 215° C.) and was charged with a preblend comprising the macroactivator, the ε-caprolactam and the catalyst. This blend is heated in the mixer to a temperature of 200° C. (or 215° C.) and is mixed with a stirring speed of 64 revolutions per minute (rpm). After 10 to 20 minutes, the polymer is recovered and cooled (quenched) with liquid nitrogen. The level of residual ε-caprolactam present in the polymer obtained was quantified by extracting the ε-caprolactam with boiling water. The degree of conversion of the polymerization was calculated from the level of residual ε-caprolactam.

The conversions obtained for the polymerizations are presented in Table 1.

TABLE 1

Influence of the degree of TMI grafting of the macroactivator PP-g-TMI on the polymerization of ε-caprolactam.

| [A]/[CL]/[C][a] | [TMI]$_g$ (phr) | Conversion (%) |
|---|---|---|
| 25/75/4 | 1.30 | 83.2 |
| 25/75/4 | 3.34 | 86.0 |
| 25/75/4 | 6.48 | 90.5[b] |
| 50/50/4 | 1.30 | 84.5 |
| 50/50/4 | 3.34 | 87.9 |
| 50/50/4 | 6.48 | 91.1[b] |

[a][A]/[CL]/[C] is the ratio by weight of the macroactivator [A], of the ε-caprolactam [CL] and of the catalyst [C].
[b]Temperature: 200° C., others 215° C.

In Table 1, "phr" is the abbreviation for "per hundred relative" and means that this is the number of parts of TMI per 100 parts of polypropylene. The increase in the degree of TMI grafting results in an increase in the rate of polymerization and in an increase in the degree of conversion of the polymerization. The values of degree of conversion obtained for the degree of grafting of 6.48 phr are similar to the values which would be obtained under thermodynamic equilibrium. In contrast, the degrees of conversion with a degree of grafting of 1.30 phr are lower.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing references are hereby incorporated by reference.

The invention claimed is:

1. Compatibilizer comprising a polyolefin backbone and polyamide grafts wherein:
   the grafts are attached to the backbone via the residues of an unsaturated monomer (A) having a functional group which acts as activator in the polymerization of lactams and which is not an isocyanate functional group,
   the residues of the unsaturated monomer (A) are fixed to the backbone by grafting from its double bond,
wherein (A) is an oxazoline of the following formula

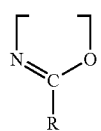

wherein R derives from an alkyl, aromatic or cycloalkyl group and R carries a double ond which opens to graft to the backbone.

2. Process for the preparation of the compatibilizer according to claim 1, wherein (i) the unsaturated monomer (A) is grafted to the polyolefin backbone and then (ii) a precursor lactam of the grafts and a catalyst are added and heating is carried out to obtain anionic polymerization of the lactam, which spreads starting from the activating functional group carried by (A); subsequently, the compatibilizer and a polyamide which has formed apart from the grafts are optionally separated; wherein (A) is an oxazoline of the following formula

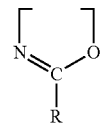

wherein R derives from an alkyl, aromatic or cycloalkyl group and R carries a double bond which opens to graft to the backbone.

3. Compatibilizer comprising a polyolefin backbone and olyamide grafts wherein:
   the grafts are attached to the backbone via the residues of an unsaturated monomer (A) having a functional group which acts as activator in the polymerization of lactams and which is not an isocyanate functional group,
   the residues of the unsaturated monomer (A) are fixed to the backbone by copolymerization from its double bond,
wherein (A) is an oxazoline of the following formula

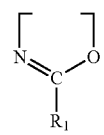

wherein R$_1$ derives from an alkyl, aromatic or cycloalkyl group and R$_1$ carries a double bond which opens to graft to the backbone.

4. Process for the preparation of the compatibilizer according to claim 3, wherein (i) the unsaturated monomer (A) and the other constituents of the polyolefin backbone are copolymerized and then (ii) a precursor lactam of the grafts and a catalyst are added and heating is carried out to obtain anionic polymerization of the lactam which spreads starting from the activating functional group carried by (A); subsequently, the compatibilizer and a polyamide which has formed apart from the grafts are optionally separated;
wherein (A) is an oxazoline of the following formula

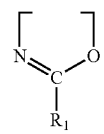

wherein R$_1$ derives from an alkyl, aromatic or cycloalkyl group and R$_1$ carries a double bond which opens to graft to the backbone.

5. Compatibilizer comprising a polyolefin backbone and polyamide grafts wherein:
   the grafts are attached to the backbone via the residues of a difunctional monomer (A3) having a first functional group which acts as activator in the polymerization of lactams and a second functional group capable of reacting with a reactive site of the polyolefin backbone,
the residues of the unsaturated monomer (A3) are fixed to the backbone by reaction of its second functional group with a reactive site of the polyolefin backbone,
wherein (A3) is a oxazoline of following formula:

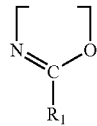

wherein $R_1$ derives from an alkyl, aromatic or cycloalkyl group and $R_1$ carries the second functional group.

6. Process for the preparation of the compatibilizer according to claim 5, wherein (i) the difunctional monomer (A3) is attached to the polyolefin backbone and then (ii) a precursor lactam of the grafts and a catalyst are added and heating is carried out to obtain anionic polymerization of the lactam, which spreads starting from the activating functional group carried by (A3); subsequently, the compatibilizer and a polyamide which has formed apart from the grafts are optionally separated;
wherein (A3) is a oxazoline of following formula:

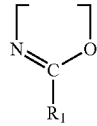

wherein $R_1$ derives from an alkyl, aromatic or cycloalkyl group and $R_1$ carries the second functional group.

7. Process according to claim 6, wherein the functional group carried by $R_1$ is an acid, hydroxyl or halide functional group.

8. Compatibilizer according to claim 5, wherein the functional group carried by $R_1$ is an acid, hydroxyl or halide functional group.

9. Compatibilizer comprising a polyolefin backbone and polyamide grafts wherein:
the grafts are attached to the backbone via the residues of a bisoxazoline (A3) having a first functional group which acts as activator in the polymerization of lactams and a second functional group capable of reacting with a reactive site of the polyolefin backbone,
the residues of the unsaturated monomer (A3) are fixed to the backbone by reaction of its second functional group with a reactive site of the polyolefin backbone,
wherein the second functional group of the bisoxazoline is carried on a group derived from an alkyl, aromatic or cycloalkyl group.

10. Process for the preparation of a compatibilizer comprising a polyolefin backbone and polyamide grafts wherein in the compatibilizer:
the grafts are attached to the backbone via the residues of a bisoxazoline (A3) having a first functional group which acts as activator in the polymerization of lactams and a second functional group capable of reacting with a reactive site of the polyolefin backbone,
the residues of the unsaturated monomer (A3) are fixed to the backbone by reaction of its second functional group with a reactive site of the polyolefin backbone,
wherein the second functional group of the bisoxazoline is carried on a group derived from an alkyl, aromatic or cycloalkyl group;
wherein in the process: (i) the difunctional monomer (A3) is attached to the polyolefin backbone and then (ii) the precursor lactam of the grafts and a catalyst are added and heating is carried out to obtain anionic polymerization of the lactam, which spreads starting from the activating functional group carried by (A3); subsequently, the compatibilizer and polyamide which has formed apart from the grafts are optionally separated.

* * * * *